(12) United States Patent
Liu et al.

(10) Patent No.: US 10,780,545 B2
(45) Date of Patent: Sep. 22, 2020

(54) DEVICE FOR REMOVING TOOL JOINT EDGE BURRS FROM CAP OPENING OF WHEEL

(71) Applicant: CITIC DICASTAL CO., LTD, Qinhuangdao, Hebei (CN)

(72) Inventors: Huiying Liu, Hebei (CN); Hongsen Zhang, Hebei (CN)

(73) Assignee: CITIC DICASTAL CO., LTD, Qinhuangdao (CN)

( * ) Notice: Subject to any disclaimer, the term of this patent is extended or adjusted under 35 U.S.C. 154(b) by 170 days.

(21) Appl. No.: 15/893,119

(22) Filed: Feb. 9, 2018

(65) Prior Publication Data

US 2019/0202020 A1 Jul. 4, 2019

(30) Foreign Application Priority Data

Dec. 29, 2017 (CN) .......................... 2017 1 14766749

(51) Int. Cl.
| | |
|---|---|
| *B24B 5/44* | (2006.01) |
| *B24B 41/06* | (2012.01) |
| *B23D 79/04* | (2006.01) |
| *B24B 9/02* | (2006.01) |
| *B23B 29/034* | (2006.01) |
| *B24B 27/00* | (2006.01) |

(52) U.S. Cl.
CPC .............. *B24B 5/44* (2013.01); *B23B 29/034* (2013.01); *B23B 29/03446* (2013.01); *B23D 79/04* (2013.01); *B24B 9/02* (2013.01); *B24B 27/0023* (2013.01); *B24B 27/0069* (2013.01); *B24B 41/06* (2013.01)

(58) Field of Classification Search
CPC .... B24B 5/12; B24B 5/35; B24B 5/44; B24B 9/02; B24B 9/04; B24B 19/00; B24B 21/02; B24B 21/12; B24B 21/16; B24B 27/0023; B24B 27/0069; B24B 27/0076; B24B 41/005; B24B 41/067; B24B 49/12; B24B 41/06; B23B 29/034; B23B 29/03446; B23D 79/04
USPC .......................................................... 451/254
See application file for complete search history.

(56) References Cited

U.S. PATENT DOCUMENTS

| | | | | |
|---|---|---|---|---|
| 3,209,494 A | * | 10/1965 | Seidel .................... | B23B 31/36 451/24 |
| 3,258,804 A | * | 7/1966 | Fowle .................... | B24B 5/225 15/88 |
| 4,216,560 A | * | 8/1980 | Schmidt .................. | B24B 41/06 15/268 |
| 5,134,807 A | * | 8/1992 | Keefe ...................... | B24B 7/16 451/259 |
| 5,161,281 A | * | 11/1992 | Hanen ..................... | B08B 1/04 15/88.3 |

(Continued)

*Primary Examiner* — Eileen P Morgan
(74) *Attorney, Agent, or Firm* — Cooper Legal Group, LLC

(57) ABSTRACT

Disclosed is a device for removing tool joint edge burrs from a cap opening of a wheel. The cap opening of the wheel is an opening configured to mount a decorative cap of the wheel. The tool joint edge burrs are formed inside the cap opening of the wheel during machining the wheel and are a circular edge inside the cap opening. The device includes a cutter system which is configured to remove the tool joint edge burrs from the cap opening of the wheel by a first cutting edge and a second cutting edge of the cutter system.

1 Claim, 13 Drawing Sheets

(56) References Cited

U.S. PATENT DOCUMENTS

| | | | | |
|---|---|---|---|---|
| 5,762,542 | A * | 6/1998 | Sandvold | B24B 9/002 |
| | | | | 451/188 |
| 7,351,130 | B1 * | 4/2008 | Chang | B24B 7/06 |
| | | | | 451/11 |
| 2007/0037497 | A1 * | 2/2007 | Tanaka | B24B 5/44 |
| | | | | 451/312 |
| 2007/0042678 | A1 * | 2/2007 | Tanaka | B24B 5/44 |
| | | | | 451/5 |
| 2007/0044311 | A1 * | 3/2007 | Tanaka | B21D 53/26 |
| | | | | 29/894.321 |
| 2013/0102233 | A1 * | 4/2013 | Cheon | B24B 27/033 |
| | | | | 451/331 |
| 2014/0194038 | A1 * | 7/2014 | Lowe | B24B 9/04 |
| | | | | 451/11 |
| 2017/0056978 | A1 * | 3/2017 | Su | B23B 41/00 |

\* cited by examiner

DEVICE FOR REMOVING TOOL JOINT EDGE BURRS FROM CAP OPENING OF WHEEL

CROSS REFERENCE TO RELATED APPLICATION

This application claims priority to Chinese Patent Application No. 201711476674.9 entitled DEVICE FOR REMOVING TOOL JOINT EDGE BURRS FROM CAP OPENING OF WHEEL filed Dec. 29, 2017, which is incorporated herein by reference for all purposes.

FIELD OF THE INVENTION

The present invention relates to the technical field of burr removal, and specifically, to a device for removing cap opening burrs from a wheel.

BACKGROUND ART

A wheel is machined by a first turning and then a second turning. The first turning and the second turning are machining steps. The first turning and the second turning turn, i.e., machine, the rotating workpiece, i.e., the rotating wheel, by a tool. The first turning turns a center hole of the wheel, and the second turning turns a cap opening of the wheel. The cap opening of the wheel is an opening configured to mount a decorative cap of the wheel. A tool is withdrawn from a tool withdrawal groove after the center hole is completed by first turning. A tool is withdrawn along an oblique chamfer of the cap opening after the cap opening is completed by second turning. The part where the first turning and the second turning intersect is the tool joint. Tool joint edge burrs are formed inside the cap opening of the wheel at the joint of the first turning and the second turning. In other words, the tool joint edge burrs refer to the edge of the tool joint of the first turning and the second turning. The tool joint edge is located inside the cap opening of the wheel and is a circular edge inside the cap opening. This circular edge is called tool joint edge burrs. The burrs located inside the narrow cap opening are very difficult to remove. The burrs are mostly manually removed at present, so that the internal area of the cap opening is easily scratched. The burrs are not removed uniformly, which easily results in corrosion failure. On the basis of the current situation, the present patent designed a device for automatically removing burrs from a first and second tool joint inside a cap opening with high precision. The device can eliminate the influence of coaxiality deviation of first and second turning on the burr removing effect. The coaxiality deviation is the coaxiality deviation between a center axis of the cap opening of the wheel and an axis of the center hole of the wheel. The burr removing effect refers to the quality of a product such as the wheel after removing burrs. Therefore, the device has very high machining precision and can be used for automatic continuous production.

SUMMARY OF THE INVENTION

The aim of the present invention is to provide a device for removing tool joint edge burrs from a cap opening of a wheel, which can be used for automatic continuous production and is advanced, stable, efficient and high in accuracy.

In order to fulfill the above aim, the technical solution of the present invention is as follows:

A device for removing tool joint edge burrs from a cap opening of a wheel is provided. The device comprises a frame, a first cylinder, a first positioning guide rail, a second cylinder, a first sliding plate, a second sliding plate, four positioning posts, corner cylinder pressure claws, a third cylinder, a movable plate, four guide posts, a support frame, a servo motor, a rotating table, a first vertical plate, a second vertical plate, a turnover platform, a turnover motor, an upright post, a fourth cylinder, a second guide rail, a first sliding block, a second sliding block, a spring, a first cutting edge, a second cutting edge, an adjusting cone, two angle adjusting cylinders, third sliding blocks, a central post, four connecting rods and four positioning rods.

The wheel is a workpiece and has burrs at the cap opening of the wheel. The wheel can be preliminarily positioned as follows. The first cylinder and the second cylinder are symmetrically mounted on the frame. The output end of the first cylinder is connected with the first sliding plate, and the output end of the second cylinder is connected with the second sliding plate. Both the first sliding plate and the second sliding plate are mounted on the first positioning guide rail. The four positioning posts are symmetrically mounted on the first sliding plate and the second sliding plate. A corner cylinder pressure claw is mounted at the top of each positioning post. The first cylinder and the second cylinder are synchronously started, and the wheel can be preliminarily positioned via the four positioning posts.

The third cylinder is mounted at the top of the frame, and the output end of the third cylinder is connected with the movable plate to control the ascending and descending of the movable plate under the guidance of the four guide posts. The support frame is mounted on the movable plate, the servo motor is fixed on the support frame, the output end of the motor is connected with the rotating table, and the servo motor controls the rotation of the rotating table. The first vertical plate and the second vertical plate are mounted below the rotating table, the turnover motor is fixed on the second vertical plate, the output end of the turnover motor is connected with the turnover platform. The middle part of the turnover platform is a cuboid and the two ends are shafts, the shaft at an end of the turnover platform is matched with a bearing, and a bearing seat is fixed on the first vertical plate. The turnover motor controls the upper end face and lower end face of the turnover platform to be switched cyclically.

The device comprises a precision positioning system arranged on a lower end face of the turnover platform. The precision positioning system comprises the two angle adjusting cylinders, the central post, the third sliding blocks, the four connecting rods, and the four positioning rods. The number of the third sliding blocks is two. The two angle adjusting cylinders and the central post are mounted on the lower end face of the turnover platform, the output ends of the two angle adjusting cylinders are connected with all the third sliding blocks. All the third sliding blocks are matched with the central post, and under the drive of the two angle adjusting cylinders, all the third sliding blocks can slide up and down along the central post. The four connecting rods are articulated to all the third sliding blocks where two of the four connecting rods adjacent to one another are circumferentially spaced 90 degrees from each other. The four connecting rods are articulated with the four positioning rods, two of the four positioning rods adjacent to one another are circumferentially spaced 90 degrees from each other, and the ends of the four positioning rods are articulated with an end of the central post. The four positioning rods circumferentially form a cone shape, and the two angle adjusting cylinders drive all the third sliding blocks to move up and down to adjust angles between the four positioning rods so as to adjust the taper of the cone shape formed by the four positioning rods, so that the taper of the cone shape formed by the four positioning rods is identical with that of a cap opening bevel. The cap opening bevel is a bevel of the cap opening of the wheel, and the cap opening is an opening configured to mount a decorative cap of the wheel. Wheels having multiple cap opening bevel angles can be positioned by taper adjustment, so the device is wider in applicability.

The device comprises a cutter system arranged on an upper end face of the turnover platform. The cutter system comprises the upright post, the fourth cylinder, the adjusting cone, the first sliding block, the second sliding block, the second guide rail, the spring, the first cutting edge, the second cutting edge, and a blade body. The cutter system is configured to remove tool joint edge burrs from the cap opening of the wheel. The upright post is mounted on the upper end face of the turnover platform. The fourth cylinder is an electric cylinder and is mounted in a center of the upright post. An output end of the fourth cylinder is connected with the adjusting cone, and two ends of the adjusting cone are matched with the first sliding block and the second sliding block. The second guide rail is arranged at a top of the upright post, both the first sliding block and the second sliding block are mounted on the second guide rail and connected with each other via the spring, the first cutting edge is arranged at a first end of the first sliding block, and the second cutting edge is arranged at a second end of the second sliding block. The fourth cylinder drives the adjusting cone to move in a vertical direction to adjust a distance between the first cutting edge and the second cutting edge, and a reverse chamfer cutter is formed. After the distance between the first cutting edge and the second cutting edge is adjusted, the first cutting edge protrudes and forms an L shape with the blade body, and the second cutting edge protrudes and forms an L shape with the blade body. The blade body is a part of the cutter system located above the first cutting edge and the second cutting edge. Since a first part or second part of the cutter system has an L shape, it is called L-shaped reverse chamfer cutter.

After the wheel is preliminarily positioned on a roller bed, the first cylinder and the second cylinder are synchronously started to drive the four positioning posts to withdraw a tiny distance. The third cylinder is started to drive the cone shape formed by the four positioning rods to move down to the cap opening, and the four positioning rods are matched with the cap opening bevel to realize precision positioning of the wheel. Therefore, the influence of coaxiality deviation of first and second turning on the burr removing effect is eliminated, and the rotating center of the cutter is superposed with that of the burr part. The coaxiality deviation is the coaxiality deviation between a center axis of the cap opening of the wheel and an axis of the center hole of the wheel. The burr removing effect refers to the quality of a product such as the wheel after removing burrs. After the wheel is precisely positioned, the corner cylinder pressure claws are started to compress the wheel. Next, the third cylinder is started to drive the four positioning rods to ascend certain height. Then the turnover motor is started to drive the turnover platform to turn over 180 degrees, the precision positioning system turns over to the upper end face, the cutter system turns over to the lower end face. Then the third cylinder is continuously started, the cutter system enters the cap opening. Next, the fourth cylinder is started, the distance between the first cutting edge and the second cutting edge is increased via the adjusting cone till the cutting edges contact tool joint edge burrs, the servo motor is started to drive the rotating table to rotate one full rotation, i.e., the first cutting edge and the second cutting edge rotate one full rotation, and the tool joint edge burrs can be removed. By adjusting the distance between the cutting edges, the cutter system is prevented from interfering with the narrow cap opening during descending, and an L-shaped reverse chamfer cutter can be formed to effectively remove the burrs. By integrating the precision positioning system and the cutter system on the turnover platform, not only is the space saved, but also the working efficiency of the device is greatly improved.

The working process of the device for removing tool joint edge burrs from the cap opening of the wheel is as follows: firstly, according to the wheel produced on line, the tapers of the four positioning rods are adjusted to match the cap opening bevel; after the wheel enters the device, the first cylinder and the second cylinder are synchronously started, and the wheel is preliminarily positioned via the four positioning posts; next, the first cylinder and the second cylinder drive the four positioning posts to withdraw a tiny distance, the third cylinder is started to drive the precision positioning system to move down to the cap opening, and the wheel is precisely positioned under the coordination of the four positioning rods and the cap opening bevel; after the wheel is precisely positioned, the corner cylinder pressure claws are started to compress the wheel; next, the third cylinder is started to drive the four positioning rods to ascend certain height, and then the turnover motor is started to drive the turnover platform to turn over 180 degrees, so that the precision positioning system turns over to the upper end face, and the cutter system turns over to the lower end face; then the third cylinder is continuously started, the cutter system enters the cap opening; next, the fourth cylinder is started, and the distance between the first cutting edge and the second cutting edge is increased via the adjusting cone, till the cutting edges contact tool joint edge burrs; finally, the servo motor is started to drive the rotating table to rotate one full rotation, i.e., the first cutting edge and the second cutting edge rotate one full rotation, and the tool joint edge burrs can be removed. After the burrs are removed, each system is reset, the corner cylinder pressure claws release the wheel, the wheel is transferred via the roller bed, next wheel is prepared for burr removal, and so on.

The device of the present invention can automatically remove burrs from a first and second tool joint inside a cap opening, can be used for automatic continuous production, and is advanced, stable, efficient and high in accuracy.

Figure 1:
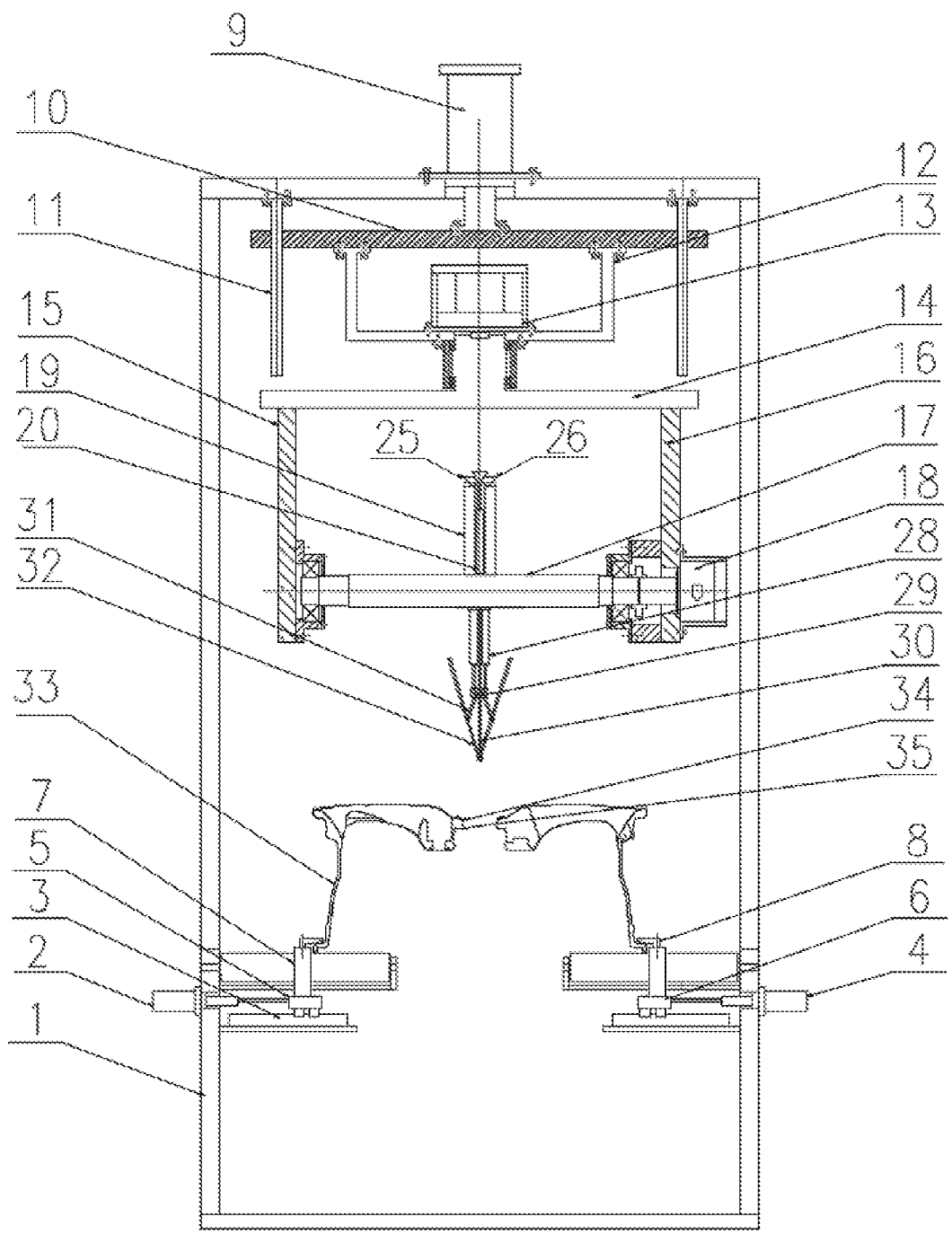
FIG. 1 is a front view of a device for removing tool joint edge burrs from a cap opening of a wheel in the present invention.
Figure 2:
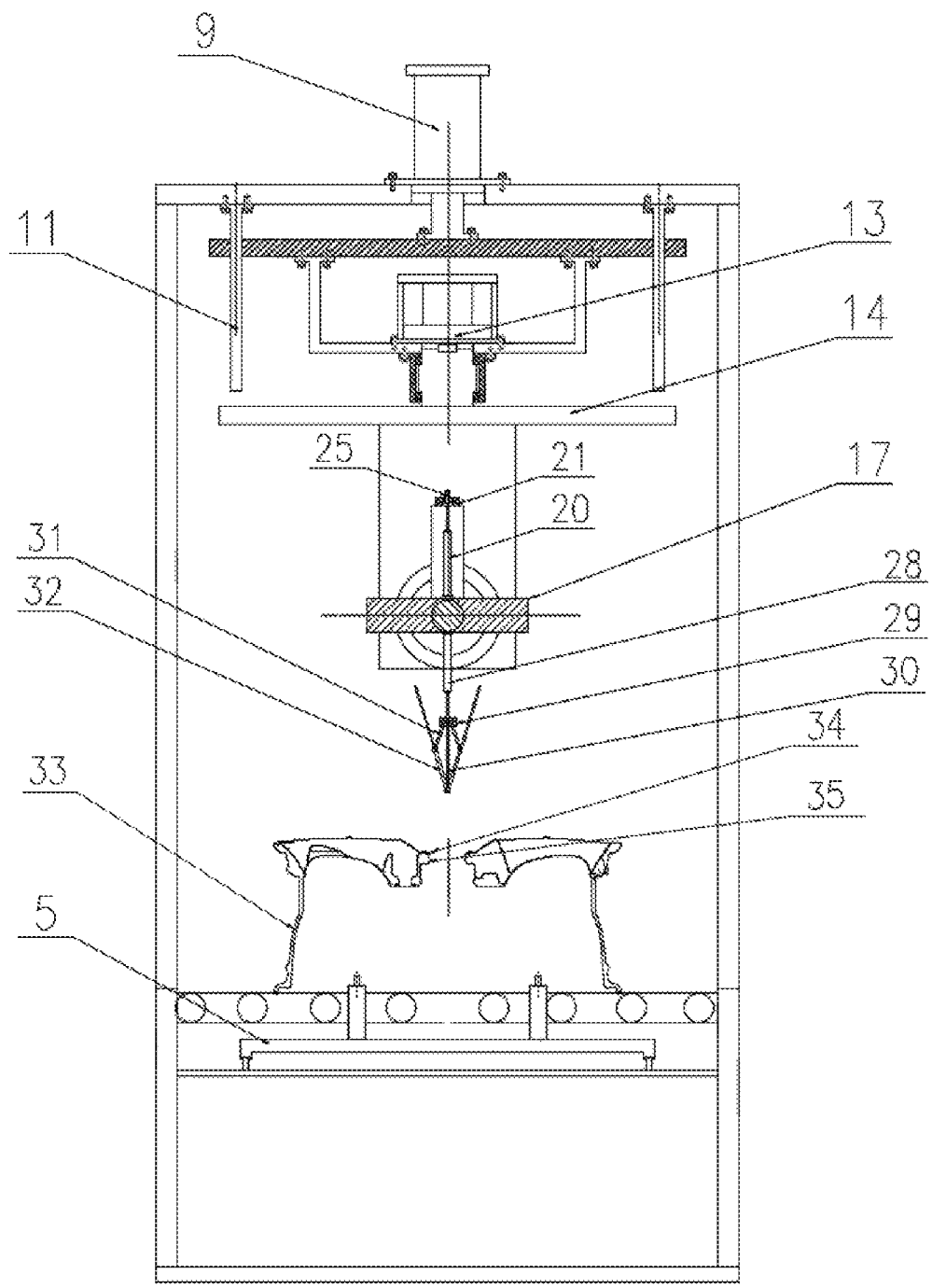
FIG. 2 is a left view of the device for removing tool joint edge burrs from the cap opening of the wheel in the present invention.
Figure 3:
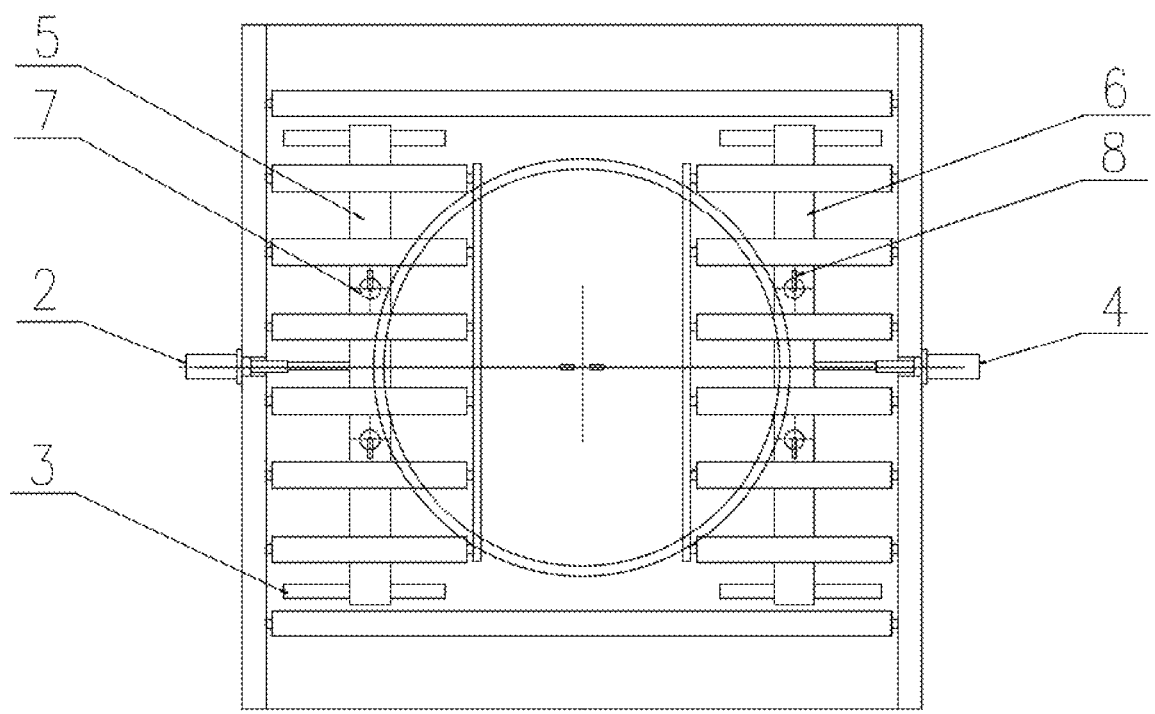
FIG. 3 is a top view of the device for removing tool joint edge burrs from the cap opening of the wheel in the present invention.
Figure 4:
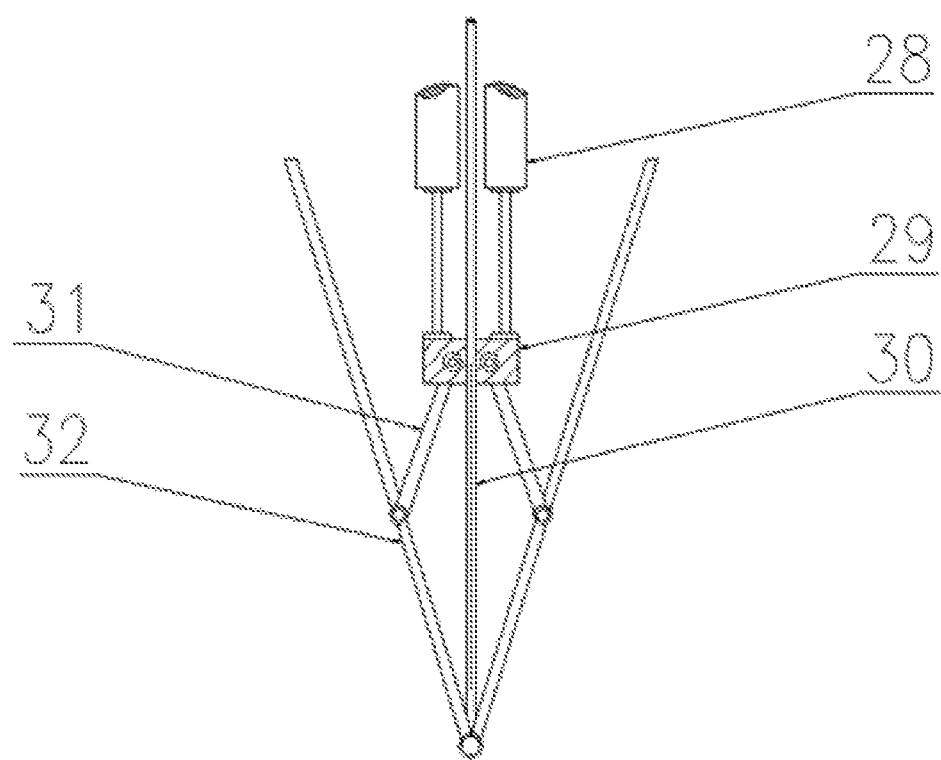
FIG. 4 is a partial front view of a precision positioning system of the device for removing tool joint edge burrs from the cap opening of the wheel in the present invention.
Figure 5:
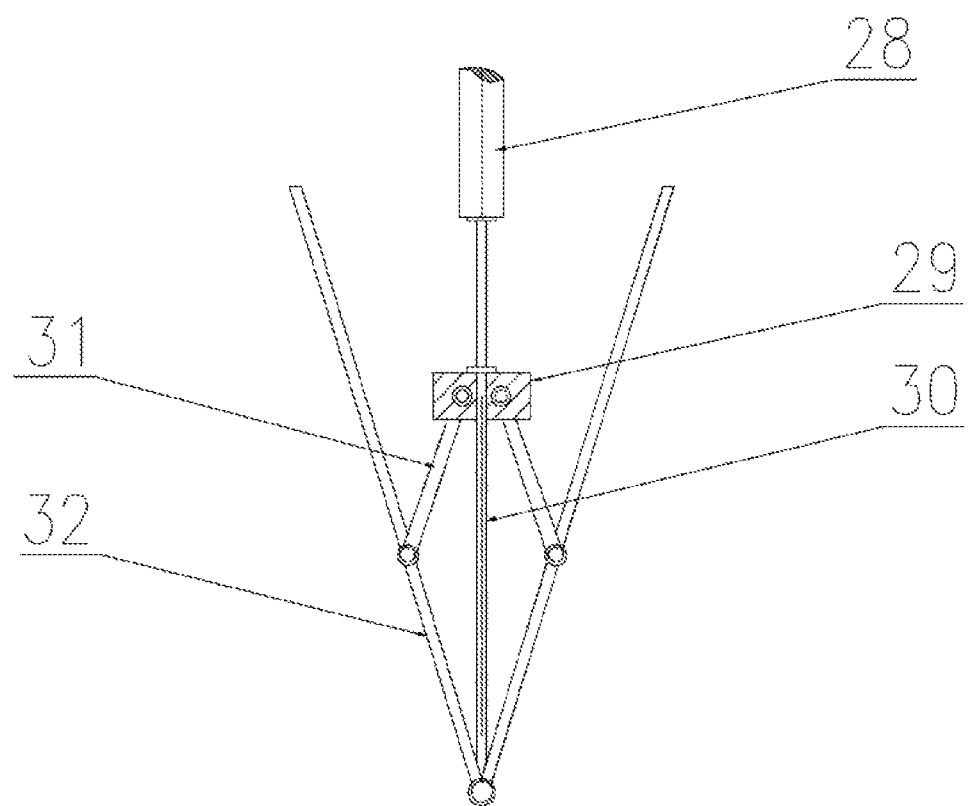
FIG. 5 is a partial left view of the precision positioning system of the device for removing tool joint edge burrs from the cap opening of the wheel in the present invention.
Figure 6:
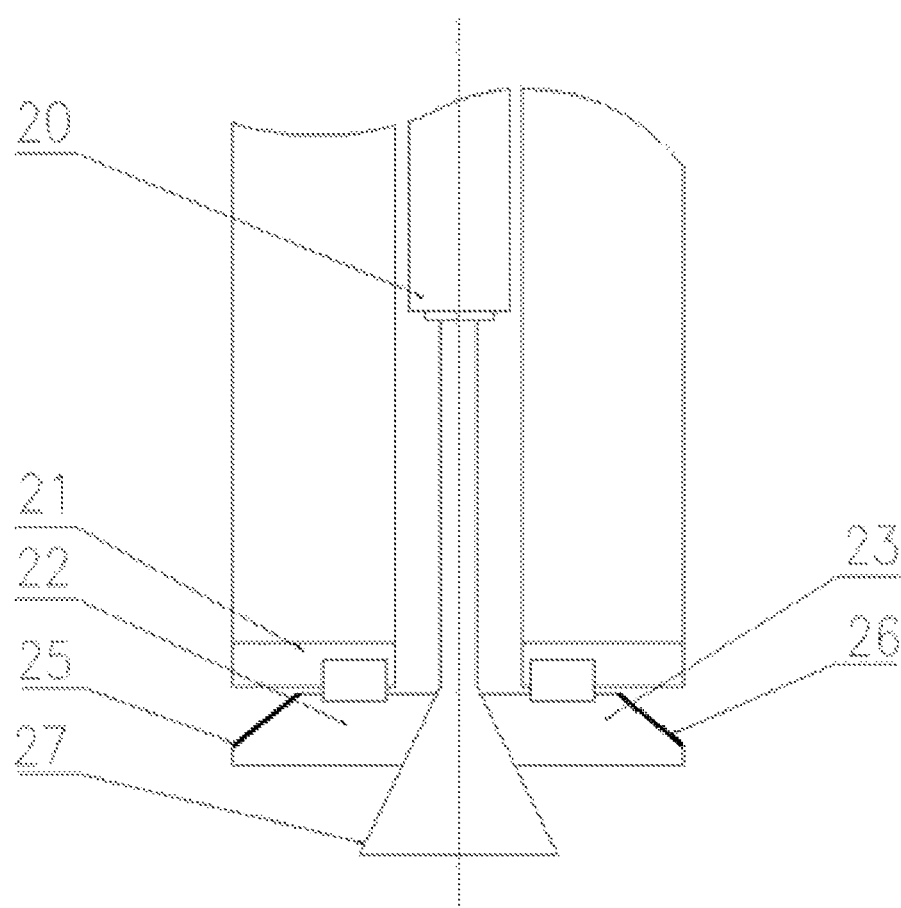
FIG. 6 is a partial front view of a cutter system of the device for removing tool joint edge burrs from the cap opening of the wheel in the present invention.
Figure 7:
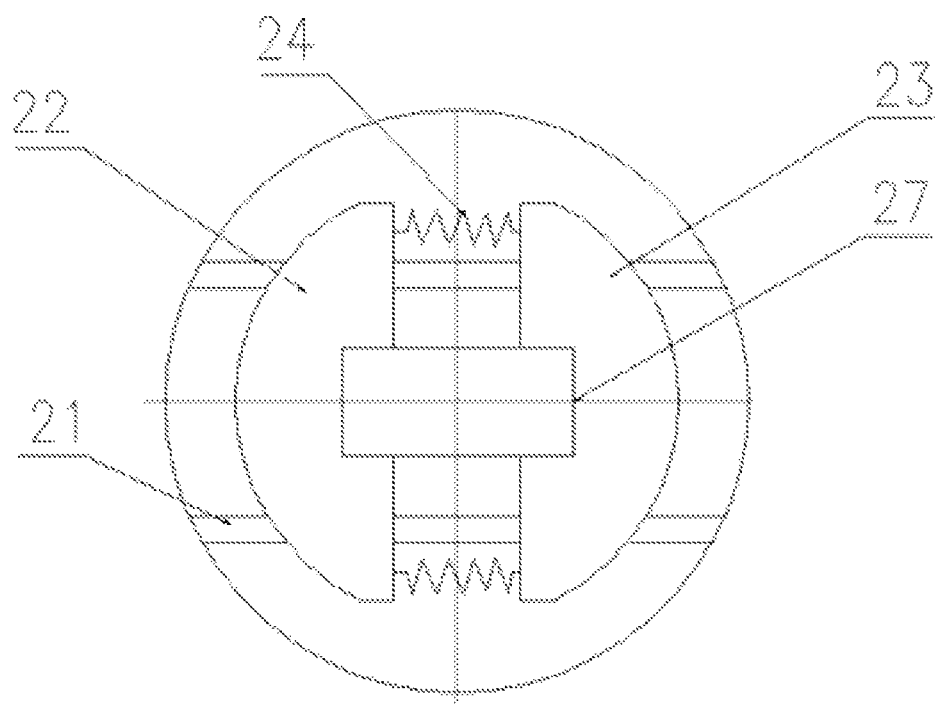
FIG. 7 is a partial bottom view of the cutter system of the device for removing tool joint edge burrs from the cap opening of the wheel in the present invention.
Figure 8:
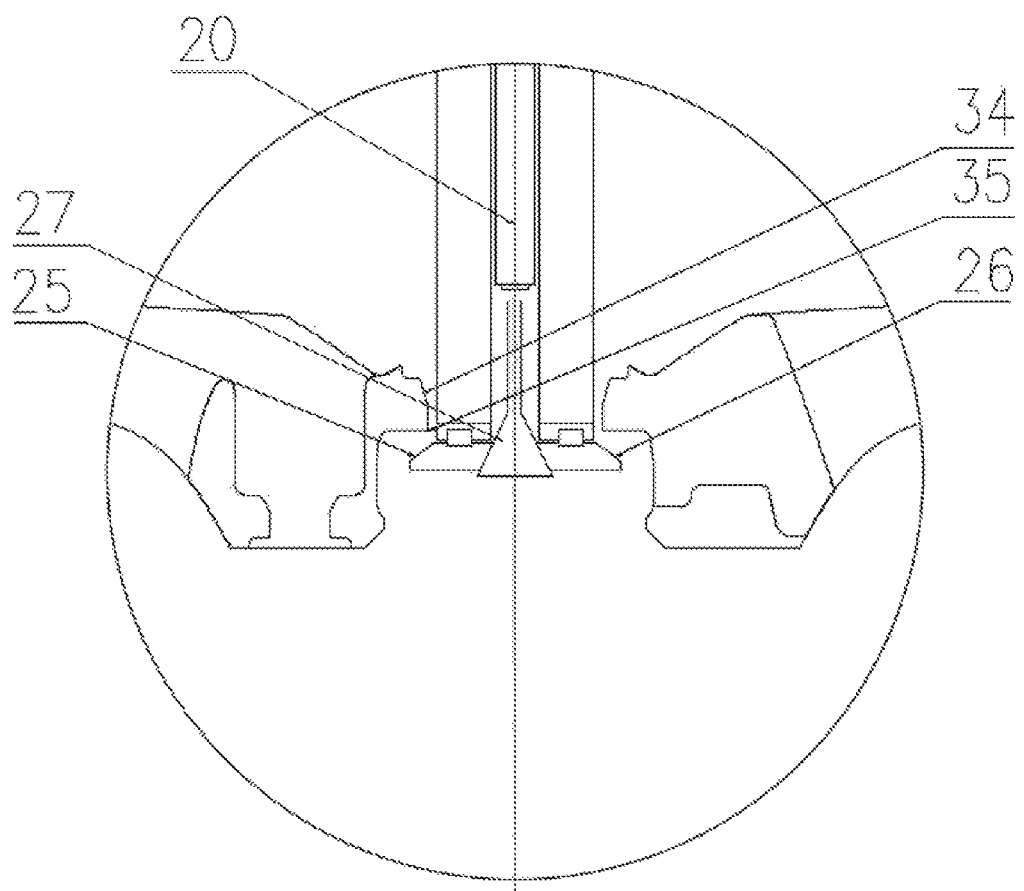
FIG. 8 is a partial schematic diagram when the device for removing tool joint edge burrs from the cap opening of the wheel in the present invention removes burrs.
Figure 9:
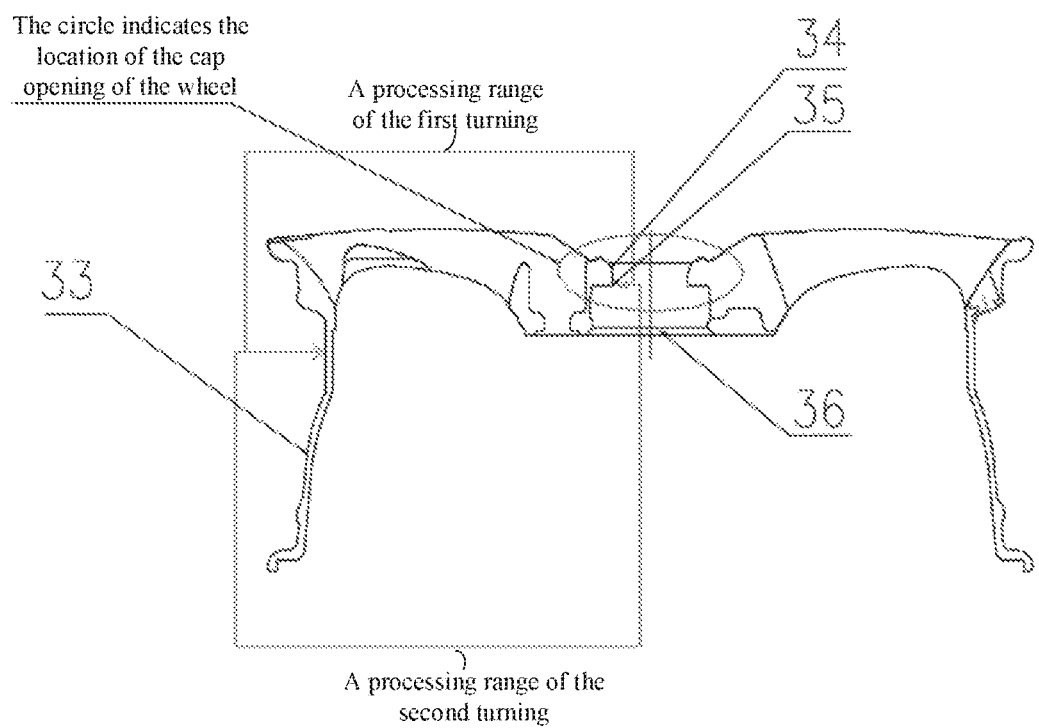
FIG. 9 is a schematic diagram showing a close-up of the wheel in the present invention.
Figure 10:
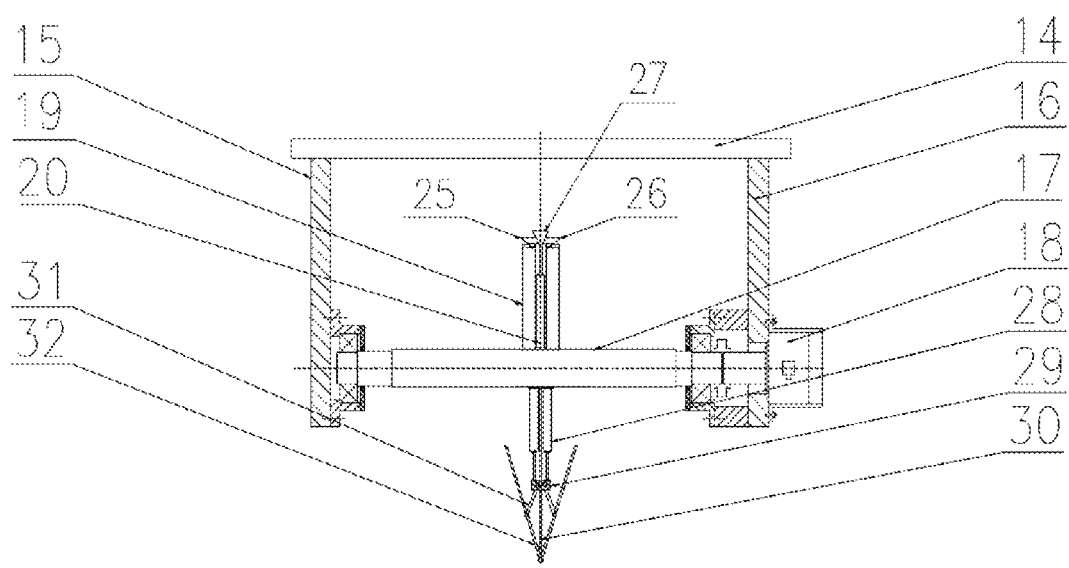
FIG. 10 is a partial front view of the precision positioning system, the cutter system and a turnover platform of the device for removing tool joint edge burrs from the cap opening of the wheel in the present invention.
Figure 11:
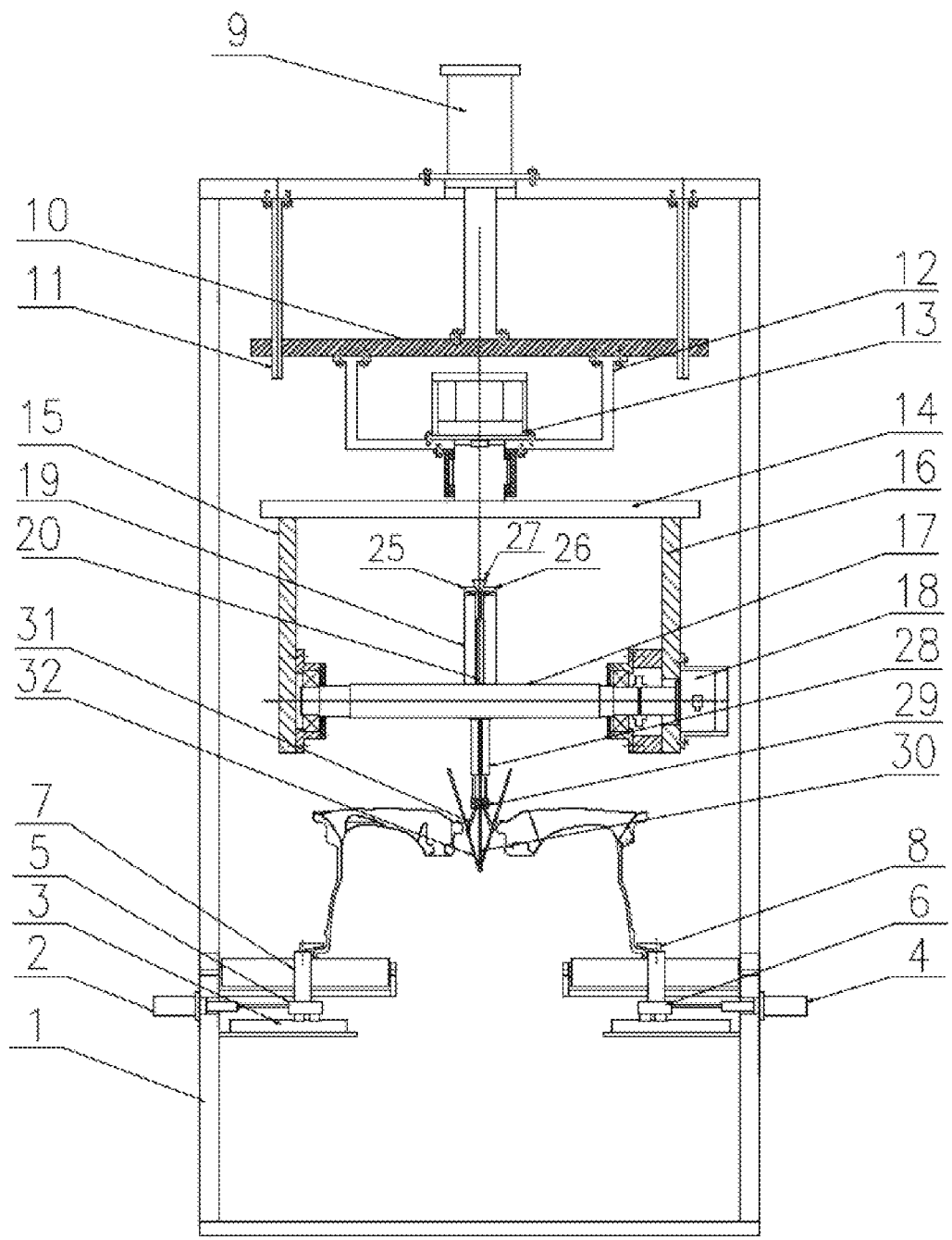
FIG. 11 is a schematic diagram of the device for removing tool joint edge burrs from the cap opening of the wheel in the present invention when the wheel is precisely positioned.
Figure 12:
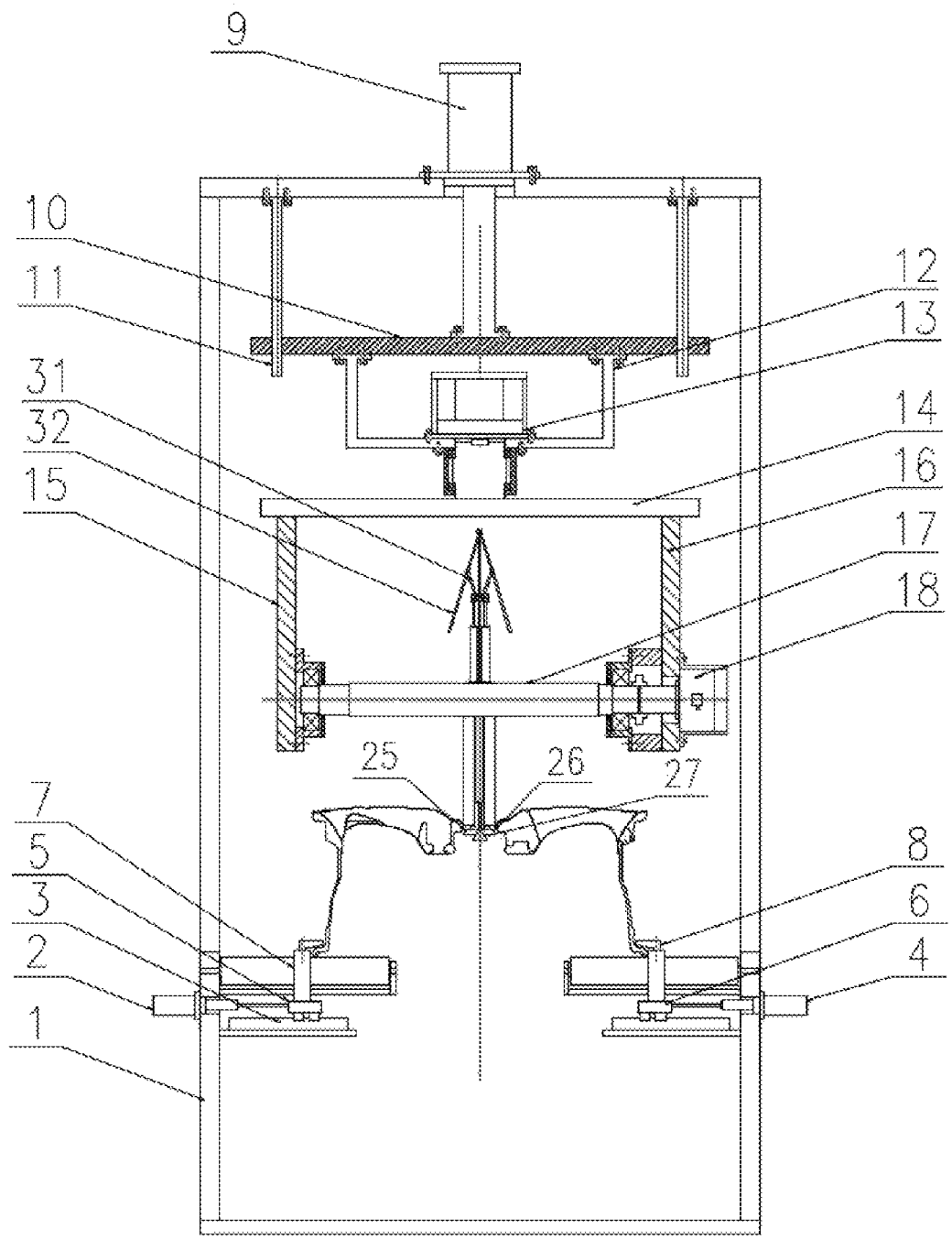
FIG. 12 is a schematic diagram when the device for removing tool joint edge burrs from the cap opening of the wheel in the present invention removes burrs.
Figure 13:
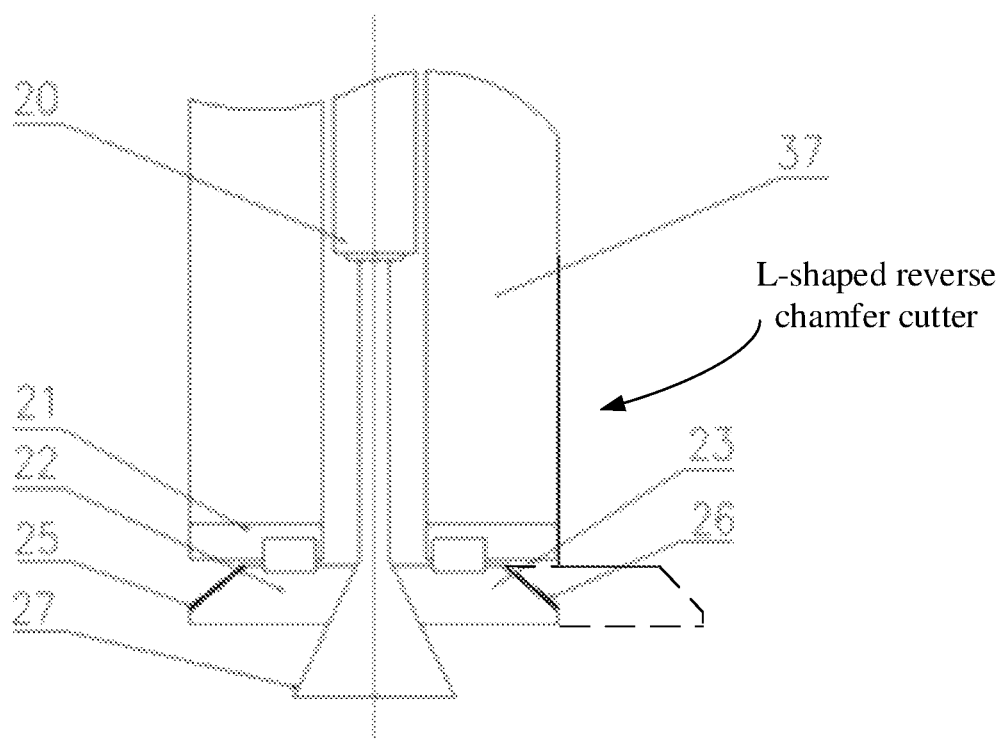
FIG. 13 is a schematic diagram showing an L-shaped reverse chamfer cutter of the device for removing tool joint edge burrs from the cap opening of the wheel in the present invention.

In which, 1—frame, 2—first cylinder, 3—first positioning guide rail, 4—second cylinder, 5—first sliding plate, 6—second sliding plate, 7—positioning post, 8—corner cylinder pressure claw, 9—third cylinder, 10—movable plate, 11—guide post, 12—support frame, 13—servo motor, 14—rotating table, 15—first vertical plate, 16—second vertical plate, 17—turnover platform, 18—turnover motor, 19—upright post, 20—fourth cylinder, 21—second guide rail, 22—first sliding block, 23—second sliding block, 24—spring, 25—first cutting edge, 26—second cutting edge, 27—adjusting cone, 28—angle adjusting cylinder, 29—third sliding block, 30—central post, 31—connecting rod, 32—positioning rod, 33—wheel, 34—cap opening bevel, 35—tool joint edge, 36—center hole of wheel, 37—blade body.

DETAILED DESCRIPTION OF THE EMBODIMENTS

Specific details and working conditions of a device provided by the present invention will be given below in combination with the accompanying drawings.

The embodiments of the present invention provide a device for removing tool joint edge burrs from a cap opening of a wheel 33. The device comprises a frame 1, a first cylinder 2, a first positioning guide rail 3, a second cylinder 4, a first sliding plate 5, a second sliding plate 6, four positioning posts 7, corner cylinder pressure claws 8, a third cylinder 9, a movable plate 10, four guide posts 11, a support frame 12, a servo motor 13, a rotating table 14, a first vertical plate 15, a second vertical plate 16, a turnover platform 17, a turnover motor 18, an upright post 19, a fourth cylinder 20, a second guide rail 21, a first sliding block 22, a second sliding block 23, a spring 24, a first cutting edge 25, a second cutting edge 26, an adjusting cone 27, two angle adjusting cylinders 28, third sliding blocks 29, a central post 30, four connecting rods and four positioning rods 32.

The wheel 33 is a workpiece and has burrs at the cap opening of the wheel. The wheel can be preliminarily positioned as follows. The first cylinder 2 and the second cylinder 4 are symmetrically mounted on the frame 1. The output end of the first cylinder 2 is connected with the first sliding plate 5, and the output end of the second cylinder 4 is connected with the second sliding plate 6. Both the first sliding plate 5 and the second sliding plate 6 are mounted on the first positioning guide rail 3, the four positioning posts 7 are symmetrically mounted on the first sliding plate 5 and the second sliding plate 6, and a corner cylinder pressure claw 8 is mounted at the top of each positioning post 7. The first cylinder 2 and the second cylinder 4 are synchronously started, and the wheel 33 can be preliminarily positioned via the four positioning posts 7.

The third cylinder 9 is mounted at the top of the frame 1, and the output end of the third cylinder 9 is connected with the movable plate 10 to control the ascending and descending of the movable plate 10 under the guidance of the four guide posts 11. The support frame 12 is mounted on the movable plate 10, the servo motor 13 is fixed on the support frame 12, the output end of the motor is connected with the rotating table 14, and the servo motor 13 controls the rotation of the rotating table 14. The first vertical plate 15 and the second vertical plate 16 are mounted below the rotating table 14, the turnover motor 18 is fixed on the second vertical plate 16, the output end of the turnover motor 18 is connected with the turnover platform 17. The middle part of the turnover platform 17 is a cuboid and the two ends are shafts, the shaft at an end of the turnover platform 17 is matched with a bearing, and a bearing seat is fixed on the first vertical plate 15. The turnover motor 18 controls the upper end face and lower end face of the turnover platform 17 to be switched cyclically.

The device comprises a precision positioning system arranged on a lower end face of the turnover platform 17. The precision positioning system comprises the two angle adjusting cylinders 28, the central post 30, the third sliding blocks 29, the four connecting rods 31, and the four positioning rods 32. The number of the third sliding blocks 29 is two. The two angle adjusting cylinders 28 and the central post 30 are mounted on the lower end face of the turnover platform 17, the output ends of the two angle adjusting cylinders 28 are connected with all the third sliding blocks 29. All the third sliding blocks 29 are matched with the central post 30, and under the drive of the two angle adjusting cylinders 28, all the third sliding blocks 29 can slide up and down along the central post 30. The four connecting rods 31 are articulated to all the third sliding blocks 29 and two of the four connecting rods 31 adjacent to one another are circumferentially spaced 90 degrees from each other. The four connecting rods 31 are articulated with the four positioning rods 32, two of the four positioning rods 32 adjacent to one another are circumferentially spaced 90 degrees from each other, and the ends of the four positioning rods 32 are articulated with the end of the central post 30. The four positioning rods 32 circumferentially form a cone shape, and the two angle adjusting cylinders 28 drive all the third sliding blocks 29 to move up and down to adjust angles between the four positioning rods 32 so as to adjust the taper of the cone shape formed by the four positioning rods 32, so that the taper of the cone shape formed by the four positioning rods 32 is identical with that of a cap opening bevel 34. The cap opening bevel 34 is a bevel of the cap opening of the wheel 33, and the cap opening is an opening configured to mount a decorative cap of the wheel 33. Wheels having multiple cap opening bevel angles can be positioned by taper adjustment, so the device is wider in applicability.

The device comprises a cutter system arranged on an upper end face of the turnover platform 17. The cutter system comprises the upright post 19, the fourth cylinder 20, the adjusting cone 27, the first sliding block 22, the second sliding block 23, the second guide rail 21, the spring 24, the first cutting edge 25, the second cutting edge 26, and a blade body 37. The cutter system is configured to remove tool joint edge burrs from the cap opening of the wheel. The upright post 19 is mounted on the upper end face of the turnover platform 17. The fourth cylinder 20 is an electric cylinder and is mounted in the center of the upright post 19. The output end of the fourth cylinder 20 is connected with the adjusting cone 27, and the two ends of the adjusting cone 27 are matched with the first sliding block 22 and the second sliding block 23. The second guide rail 21 is arranged at the top of the upright post 19, both the first sliding block 22 and the second sliding block are mounted on the second guide rail 21 and connected with each other via the spring 24, the first cutting edge 25 is arranged at the first end of the first sliding block 22, and the second cutting edge 26 is arranged at the second end of the second sliding block 23. The fourth cylinder 20 drives the adjusting cone 27 to move in a vertical direction to adjust the distance between the first cutting edge 25 and the second cutting edge 26, and a reverse chamfer cutter is formed. After the distance between the first cutting edge 25 and the second cutting edge 26 is adjusted, the first cutting edge 25 protrudes and forms an L shape with the blade body 37, and the second cutting edge 26 protrudes and forms an L shape with the blade body 37. The blade body 37 is a part of the cutter system located above the first cutting edge 25 and the second cutting edge 26. Since a first part or second part of the cutter system has an L shape, it is called L-shaped reverse chamfer cutter.

After the wheel is preliminarily positioned on a roller bed, the first cylinder 2 and the second cylinder 4 are synchronously started to drive the four positioning posts 7 to withdraw a tiny distance. The third cylinder 9 is started to drive the cone shape formed by the four positioning rods 32 to move down to the cap opening, and the four positioning rods 32 are matched with the cap opening bevel 34 to realize precision positioning of the wheel. Therefore, the influence of coaxiality deviation of first and second turning on the burr removing effect is eliminated, and the rotating center of the cutter is superposed with that of the burr part. The coaxiality deviation is the coaxiality deviation between a center axis of the cap opening of the wheel and an axis of the center hole 36 of the wheel. The burr removing effect refers to the quality of a product such as the wheel after removing burrs. After the wheel is precisely positioned, the corner cylinder pressure claws 8 are started to compress the wheel. Next, the third cylinder 9 is started to drive the four positioning rods 32 to ascend certain height. Then the turnover motor 18 is started to drive the turnover platform 17 to turn over 180 degrees, the precision positioning system turns over to the upper end face, the cutter system turns over to the lower end face. Then the third cylinder 9 is continuously started, the cutter system enters the cap opening. Next, the fourth cylinder 20 is started, the distance between the first cutting edge 25 and the second cutting edge 26 is increased via the adjusting cone 27 till the cutting edges contact tool joint edge burrs, the servo motor 13 is started to drive the rotating table 14 to rotate one full rotation, i.e., the first cutting edge 25 and the second cutting edge 26 rotate one full rotation, and the tool joint edge burrs can be removed. By adjusting the distance between the cutting edges, the cutter system is prevented from interfering with the narrow cap opening during descending, and an L-shaped reverse chamfer cutter can be formed to effectively remove the burrs. By integrating the precision positioning system and the cutter system on the turnover platform, not only is the space saved, but also the working efficiency of the device is greatly improved.

The working process of the device for removing tool joint edge burrs from the cap opening of the wheel is as follows: firstly, according to the wheel produced on line, the tapers of the four positioning rods 32 are adjusted to match the cap opening bevel; after the wheel enters the device, the first cylinder 2 and the second cylinder 4 are synchronously started, and the wheel is preliminarily positioned via the four positioning posts 7; next, the first cylinder 2 and the second cylinder 4 drive the four positioning posts 7 to withdraw a tiny distance, the third cylinder 9 is started to drive the precision positioning system to move down to the cap opening, and the wheel is precisely positioned under the coordination of the four positioning rods 32 and the cap opening bevel; after the wheel is precisely positioned, the corner cylinder pressure claws 8 are started to compress the wheel; next, the third cylinder 9 is started to drive the four positioning rods 32 to ascend certain height, and then the turnover motor 18 is started to drive the turnover platform 17 to turn over 180 degrees, so that the precision positioning system turns over to the upper end face, and the cutter system turns over to the lower end face; then the third cylinder 9 is continuously started, the cutter system enters the cap opening; next, the fourth cylinder 20 is started, and the distance between the first cutting edge 25 and the second cutting edge 26 is increased via the adjusting cone 27, till the cutting edges contact tool joint edge burrs; finally, the servo motor 13 is started to drive the rotating table 14 to rotate one full rotation, i.e., the first cutting edge 25 and the second cutting edge 26 rotate one full rotation, and the tool joint edge burrs can be removed. After the burrs are removed, each system is reset, the corner cylinder pressure claws 8 release the wheel, the wheel is transferred via the roller bed, next wheel is prepared for burr removal, and so on.

The device of the present invention can automatically remove burrs from a first and second tool joint inside a cap opening, can be used for automatic continuous production, and is advanced, stable, efficient and high in accuracy.

The invention claimed is:

1. A device for removing tool joint edge burrs from a cap opening of a wheel, the cap opening of the wheel being an opening configured to mount a decorative cap of the wheel, the tool joint edge burrs being formed inside the cap opening of the wheel during machining the wheel and being a circular edge inside the cap opening, the wheel being a workpiece, the device comprising a frame, a first cylinder, a first positioning guide rail, a second cylinder, a first sliding plate, a second sliding plate, four positioning posts, corner cylinder pressure claws, a third cylinder, a movable plate, four guide posts, a support frame, a servo motor, a rotating table, a first vertical plate, a second vertical plate, a turnover platform, a turnover motor, an upright post, a fourth cylinder, a second guide rail, a first sliding block, a second sliding block, a spring, a first cutting edge, a second cutting edge, an adjusting cone, two angle adjusting cylinders, third sliding blocks, a central post, four connecting rods and four positioning rods;

wherein the first cylinder and the second cylinder are symmetrically mounted on the frame, an output end of the first cylinder is connected with the first sliding plate, and an output end of the second cylinder is connected with the second sliding plate, both the first sliding plate and the second sliding plate are mounted on the first positioning guide rail, the four positioning posts are symmetrically mounted on the first sliding plate and the second sliding plate, a corner cylinder pressure claw of the corner cylinder pressure claws is mounted at a top of each positioning post of the four positioning posts, the first cylinder and the second cylinder are synchronously started, and the wheel is preliminarily positioned via the four positioning posts;

wherein the third cylinder is mounted at a top of the frame, and an output end of the third cylinder is connected with the movable plate to control ascending and descending of the movable plate under a guidance of the four guide posts, the support frame is mounted on the movable plate, the servo motor is fixed on the support frame, an output end of the servo motor is connected with the rotating table, and the servo motor controls rotation of the rotating table, the first vertical plate and the second vertical plate are mounted below the rotating table, the turnover motor is fixed on the second vertical plate, an output end of the turnover motor is connected with the turnover platform, a middle part of the turnover platform is a cuboid and two ends of the turnover platform are shafts, a shaft at an end of the turnover platform is matched with a bearing, and a bearing seat is fixed on the first vertical plate, the turnover motor controls an upper end face and a lower end face of the turnover platform to be switched cyclically;

wherein the device comprises a precision positioning system arranged on the lower end face of the turnover platform, the precision positioning system comprises the two angle adjusting cylinders, the central post, the third sliding blocks, the four connecting rods, and the four positioning rods, the number of the third sliding blocks is two, the two angle adjusting cylinders and the central post are mounted on the lower end face of the turnover platform, output ends of the two angle adjusting cylinders are connected with all the third sliding blocks, all the third sliding blocks are matched with the central post, and under drive of the two angle adjusting cylinders, all the third sliding blocks are configured to slide up and down along the central post; the four connecting rods are articulated to all the third sliding blocks where two of the four connecting rods adjacent to one another are circumferentially spaced 90 degrees from each other, the four connecting rods are articulated with the four positioning rods, two of the four positioning rods adjacent to one another are circumferentially spaced 90 degrees from each other, and ends of the four positioning rods are articulated with an end of the central post;

wherein the four positioning rods circumferentially form a cone shape, and the two angle adjusting cylinders drive all the third sliding blocks to move up and down to adjust angles between the four positioning rods so as to adjust a taper of the cone shape formed by the four positioning rods, so that the taper of the cone shape formed by the four positioning rods is identical with that of a cap opening bevel to position the wheel, the cap opening bevel is a bevel of the cap opening of the wheel; and wherein the device comprises a cutter system arranged on the upper end face of the turnover platform, the cutter system comprises the upright post, the fourth cylinder, the adjusting cone, the first sliding block, the second sliding block, the second guide rail, the spring, the first cutting edge, the second cutting edge, and a blade body, the blade body is a part of the cutter system located above the first cutting edge and the second cutting edge, the cutter system is configured to remove the tool joint edge burrs from the cap opening of the wheel, the upright post is mounted on the upper end face of the turnover platform, the fourth cylinder is an electric cylinder and is mounted in a center of the upright post, an output end of the fourth cylinder is connected with the adjusting cone, and two ends of the adjusting cone are matched with the first sliding block and the second sliding block; the second guide rail is arranged at a top of the upright post, both the first sliding block and the second sliding block are mounted on the second guide rail and connected with each other via the spring, the first cutting edge is arranged at a first end of the first sliding block, and the second cutting edge is arranged at a second end of the second sliding block; the fourth cylinder is configured to drive the adjusting cone to move in a vertical direction to adjust a distance between the first cutting edge and the second cutting edge, and a reverse chamfer cutter is formed for removing the tool joint edge burrs from the cap opening of the wheel;

wherein after the distance between the first cutting edge and the second cutting edge is adjusted, the first cutting edge protrudes and forms an L shape with the blade body, and the second cutting edge protrudes and forms an L shape with the blade body, the cutter system has an L shape, and an L-shaped reverse chamfer cutter is formed;

wherein after the wheel is preliminarily positioned on a roller bed, the first cylinder and the second cylinder are synchronously started to drive the four positioning posts to withdraw a distance, the third cylinder is started to drive the cone shape formed by the four positioning rods to move down to the cap opening, and the four positioning rods are matched with the cap opening bevel to realize positioning of the wheel, after the wheel is positioned, the corner cylinder pressure claws are started to compress the wheel, the third cylinder is started to drive the four positioning rods to ascend a height, the turnover motor is started to drive the turnover platform to turn over 180 degrees, the precision positioning system turns over to the upper end face of the turnover platform, the cutter system turns over to the lower end face of the turnover platform, the third cylinder is continuously started, the cutter system enters the cap opening, the fourth cylinder is started, the distance between the first cutting edge and the second cutting edge is increased via the adjusting cone until the first cutting edge and the second cutting edge contact the tool joint edge burrs, the servo motor is started to drive the rotating table to rotate one full rotation, the first cutting edge and the second cutting edge rotate one full rotation, and the tool joint edge burrs are removed.

* * * * *